(12) United States Patent
Sun et al.

(10) Patent No.: US 7,678,266 B2
(45) Date of Patent: Mar. 16, 2010

(54) INTEGRATED WATER TREATMENT APPARATUS AND METHODS FOR NATURAL WATER IMPROVEMENT

(75) Inventors: Yongjian Sun, Clifton, VA (US); Yan Wang, Nanjing (CN)

(73) Assignee: Jiangsu Tianyi Science and Technology Development Co. Ltd., Nanjing (CN)

( * ) Notice: Subject to any disclaimer, the term of this patent is extended or adjusted under 35 U.S.C. 154(b) by 29 days.

(21) Appl. No.: 12/047,906

(22) Filed: Mar. 13, 2008

(65) Prior Publication Data

US 2009/0230041 A1    Sep. 17, 2009

(51) Int. Cl.
*B01D 35/05*    (2006.01)
*C02F 7/00*    (2006.01)

(52) U.S. Cl. .................... 210/170.05; 210/170.06; 210/170.09; 210/242.2; 210/416.1; 210/434; 261/91; 261/93

(58) Field of Classification Search ............... 210/150, 210/151, 170.05, 170.06, 170.09, 170.11, 210/194, 242.1, 242.2, 416.1, 434; 261/3, 261/5, 84, 91, 93, 120
See application file for complete search history.

(56) References Cited

U.S. PATENT DOCUMENTS

| | | | | |
|---|---|---|---|---|
| 2,137,397 A | * | 11/1938 | Haideman | 261/91 |
| 3,521,864 A | * | 7/1970 | Welles, Jr. | 210/242.2 |
| 4,086,306 A | * | 4/1978 | Yoshinaga | 261/93 |
| 4,137,171 A | * | 1/1979 | Yokata | 210/150 |
| 4,216,091 A | * | 8/1980 | Mineau | 210/194 |
| 4,287,060 A | * | 9/1981 | Coggins | 210/194 |
| 4,439,316 A | * | 3/1984 | Kozima et al. | 210/150 |
| 5,071,550 A | * | 12/1991 | Bernhardt | 210/242.2 |
| 5,085,809 A | * | 2/1992 | Stirling | 210/242.2 |
| 5,565,096 A | * | 10/1996 | Phelan | 210/150 |
| 6,357,725 B2 | * | 3/2002 | Nomura et al. | 261/5 |
| 6,432,302 B1 | | 8/2002 | Obritsch | |
| 6,439,853 B2 | | 8/2002 | Tormaschy | |
| 6,821,426 B1 | * | 11/2004 | Hausin et al. | 210/170.06 |
| 7,166,211 B1 | | 1/2007 | Boyd | |
| 7,285,208 B2 | | 10/2007 | Tormaschy | |
| 7,306,719 B2 | | 12/2007 | Tormaschy | |
| 2006/0180546 A1 | * | 8/2006 | Stuth et al. | 210/151 |

* cited by examiner

*Primary Examiner*—Christopher Upton
(74) *Attorney, Agent, or Firm*—Xin Wen

(57) ABSTRACT

A water treatment apparatus includes a float configured to float on the surface of a water body, a first fluid channel coupled to the float and configured to circulate contaminated water in the water body, and a second fluid channel coupled to the float and configured to filter contaminated water in the water body. A fluid transport apparatus can draw the contaminated water through the first fluid channel at a first flow rate and through the second fluid channel at a second flow rate.

33 Claims, 6 Drawing Sheets

INTEGRATED WATER TREATMENT APPARATUS AND METHODS FOR NATURAL WATER IMPROVEMENT

BACKGROUND

The present invention relates to the field of treatment of contaminated or polluted natural water.

In the present specification, the term "natural water" refers to a body of water, typically outdoors, which requires treatment due to contaminations or pollutions by industrial or domestic activities, or natural phenomena. Examples of natural water include rivers, streams, lakes, reservoirs, ponds, canals, sea water in a bay, and so on. The water body may have different widths and depths, and can stay substantially still or flow at different flow rates.

In much of the industrialized regions of the world, water treatment facilities are enforced to remove pollutants such as organic wastes and toxic chemicals from the industrial and municipal waste water before they can be discharged into natural water body. However, eutrophication of natural water body becomes an increasingly important issue still as the global climate and environment change under its way. More diseases have been identified to be resulted from the eutrophication of natural water and blue green algae bloom. To improve the water quality in the natural water, various natural water management measures such as lake and pond circulator, wetland system, aerators, and etc. have been deployed in natural water bodies. These measures aim to reduce eutrophication through reducing nutrient loads, improving biodiversity and balance thus to suppress bad algae bloom in natural water.

In some developing regions of the world, due to financial constraints, low economic priority, and inefficiency in law enforcement, natural waters in these regions are sometimes severely polluted by organic wastes and toxic chemicals at levels far exceeding water's natural capability to clean itself up. The high eutrophication rate of natural waters has raised global concerns. People in these regions more frequently experienced the water resource related environmental crisis, which caused loss of sources of drinking water, shut-down of factories, evacuation of population, and many health problems. Although various measures mentioned above have been implemented but hardly in a large scale, little progress has been demonstrated largely because of the cost, technology, and engineering integration issues. In particular, a technology and apparatus that can effectively reduce Total Nitrogen (TN), Total Phosphorus (TP), Biological Oxygen Demand (BOD), and Chemical Oxygen Demand (COD) in a part or the whole natural water body is highly desired to combat the eutrophication of natural water.

SUMMARY OF THE INVENTION

In a general aspect, the present invention relates to a water treatment apparatus that includes a float that can float on the surface of a water body, a first fluid channel coupled to the float and that can circulate contaminated water in the water body, a second fluid channel coupled to the float and that can filter contaminated water in the water body, and a fluid transport apparatus configured to draw the contaminated water through the first fluid channel at a first flow rate and through the second fluid channel at a second flow rate.

In another general aspect, the present invention relates to a water treatment apparatus that includes a float that can float on the surface of a water body, a first fluid channel coupled to the float and that can circulate contaminated water in the water body, a first air conduit that can transfer air or oxygen to aerate the contaminated water flowing through the first fluid channel, a second fluid channel coupled to the float and that can filter contaminated water in the water body, a second air conduit that can transfer air oxygen to aerate the contaminated water flowing through the second fluid channel; and a fluid transport apparatus configured to draw the contaminated water through the first fluid channel and the second fluid channel.

In yet another general aspect, the present invention relates to a water treatment apparatus that includes a float configured to float on the surface of a water body, a first fluid channel coupled to the float and configured to circulate contaminated water in the water body. At least a portion of the first fluid channel can be formed by a first flexible tube that allows the first fluid channel to vary in length in accordance to different water levels. The water treatment apparatus also includes a first air conduit configured to transfer air or oxygen to aerate the contaminated water flowing through the first fluid channel, a second fluid channel coupled to the float and comprising a filter configured to filter contaminated wafer in the water body. At least a portion of the first fluid channel is disposed inside the second fluid channel. At least a portion of the second fluid channel is formed by a second flexible tube that allows the second fluid channel to vary in length in accordance to the different water levels. The water treatment apparatus also includes a second air conduit configured to transfer air oxygen to aerate the contaminated water flowing through the second fluid channel, legs configured to stand on a floor of the water body to support at least a portion of the weight of the first fluid channel and the second fluid channel, and a fluid transport apparatus comprising a motor and an impeller rotatably coupled to the motor and can draw the contaminated water through the first fluid channel at a first flow rate in a range between about 5 and about 500 gallons per minute. The impeller can draw the contaminated water through the second fluid channel at a second flow rate in a range between about 1,000 and about 5,000 gallons per minute. The first fluid channel, the second fluid channel, and the fluid transport apparatus can be disposed under the float when the water treatment apparatus is deployed in a water body.

Implementations of the system may include one or more of the following. At least a portion of the first fluid channel can be disposed inside the second fluid channel. The first fluid channel and the second fluid channel can have variable lengths to allow the float to adapt to different water levels. At least a portion of the first fluid channel can be formed by a first flexible tube that allows the first fluid channel to vary in length in accordance to the different water levels. At least a portion of the second fluid channel can be formed by a second flexible tube that allows the second fluid channel to vary in length in accordance to the different water levels. The first flexible tube can have a first variable length in a range from about 0.5 meter to about 8 meters, and wherein the second flexible tube has a second variable length in a range from about 1 meter to about 10 meters. The first flow rate can be in a range between about 5 and about 500 gallons per minute. The second flow rate can be in a range between about 1,000 and about 5,000 gallons per minute. The water treatment apparatus can further include a filter installed in the first fluid channel and capable of filtering the contaminated water flowing through the first fluid channel. The filter can include a material selected from the group consisting of active carbon, porous silica, polyethylene media, a biological reaction carrier, or a chemical reaction carrier. The water treatment apparatus can further include a first air conduit that can transfer air or oxygen to aerate the contaminated water flowing through the first fluid channel and a second air conduit that can transfer air or oxygen to aerate the contaminated water flowing through the second fluid channel. Air or oxygen can be transferred to the first fluid channel by the first air conduit at a rate lower than the rate of air or oxygen transferred to the second fluid channel by the second air conduit. Air or oxygen can be transferred to the first fluid channel by the first air conduit at a rate from about 1 to about 5 liters/min. Air or oxygen can be transferred to the second fluid channel by the second air conduit at a rate from about 5 to about 30 liters/min. The fluid transport apparatus can include a motor and an impeller rotatably coupled to the motor, wherein the impeller is configured to draw the contaminated water through the first fluid channel and the second fluid channel. The first fluid channel, the second fluid channel, and the fluid transport apparatus can be disposed under the float when the water treatment apparatus is deployed in a water body. The water treatment apparatus can further include legs configured to stand on a floor of the water body to support at least a portion of the weight of the first fluid channel and the second fluid channel. The water treatment apparatus can further include means for tying the first fluid channel, the second fluid channel, and the fluid transport apparatus to an object at the floor of the water body. The float can have a diameter in a range from about 0.5 meter to about 3 meters. The first fluid channel can have a length in a range from about 1 meter to about 10 meters and a diameter in a range from about 0.5 meter to about 4 meters. The second fluid channel can have a length in a range from about 1 to about 10 meters and a diameter in a range from about 1 meter to about 5 meters. The water treatment apparatus can further include a rim around an outlet of the second fluid channel. Outlets of the first fluid channel and the second fluid channel can be positioned below the float when the water treatment apparatus is deployed in a water body. The contaminated water exiting the first fluid channel and the second fluid channel can flow through a gap between the float and the rim.

Embodiments may include one or more of the following advantages. The disclosed apparatus and methods can provide effective water treatment to a natural water body with a wide range of contamination and pollution. The disclosed apparatus and methods can remove the pollutants (totally suspended solid (TSS), heavy metals, etc), reduce the nutrient level (TN, TP, BOD, COD), improve dissolved oxygen level, enhance the biodiversity and balance, and suppress the growth of harmful microorganisms such as blue green algae in natural water body.

The present invention provide effective circulation, aeration diffusion, and filtration in an integrated apparatus to allow water treatment to be simultaneously conducted to achieve physical, chemical, and biological treatment goals. Bio-solid reduction, odor reduction, conversion and reduction of ammonia and nitrate, and thus suppression of blue green algae bloom in natural waters such as lakes and ponds, etc. can be accomplished.

The disclosed water treatment apparatus includes several water treatment capabilities such as circulation, aeration and diffusion, physical, chemical, and biological filtration, and chemical or biological reactions. The disclosed water treatment apparatus can effectively reduce the nutrient level in the water body through reduction of BOD, NH3, TN, TSS, and TP; circulate and aerate the water body to eliminate odors and fish kills; and eliminate bad algae bloom through suppressing the blue green algae growth and enhance the wellness of the food chain.

Moreover, the disclosed apparatus and methods allow easy and flexible deployment in different natural water environments. The disclosed water treatment apparatus is adjustable to be suitable for shallow or deep natural water bodies. The disclosed water treatment apparatus can remain stable in natural water that is still or flow at different rates like in rivers. The disclosed water treatment apparatus can be powered externally or by naturally generated power such as wind power or solar energy.

The disclosed water treatment apparatus is effective in bio-solid reduction, odor reduction, conversion and reduction of ammonia and nitrate, and suppression of blue green algae bloom in natural waters such as lakes and ponds etc.

Furthermore, the disclosed water treatment apparatus is aesthetically appealing with small footprint that minimizes the visual impact to the environment.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and from a part of the specification, illustrate embodiments of the present invention and, together with the description, serve to explain the principles of the invention.

DETAILED DESCRIPTION

Figure 1:
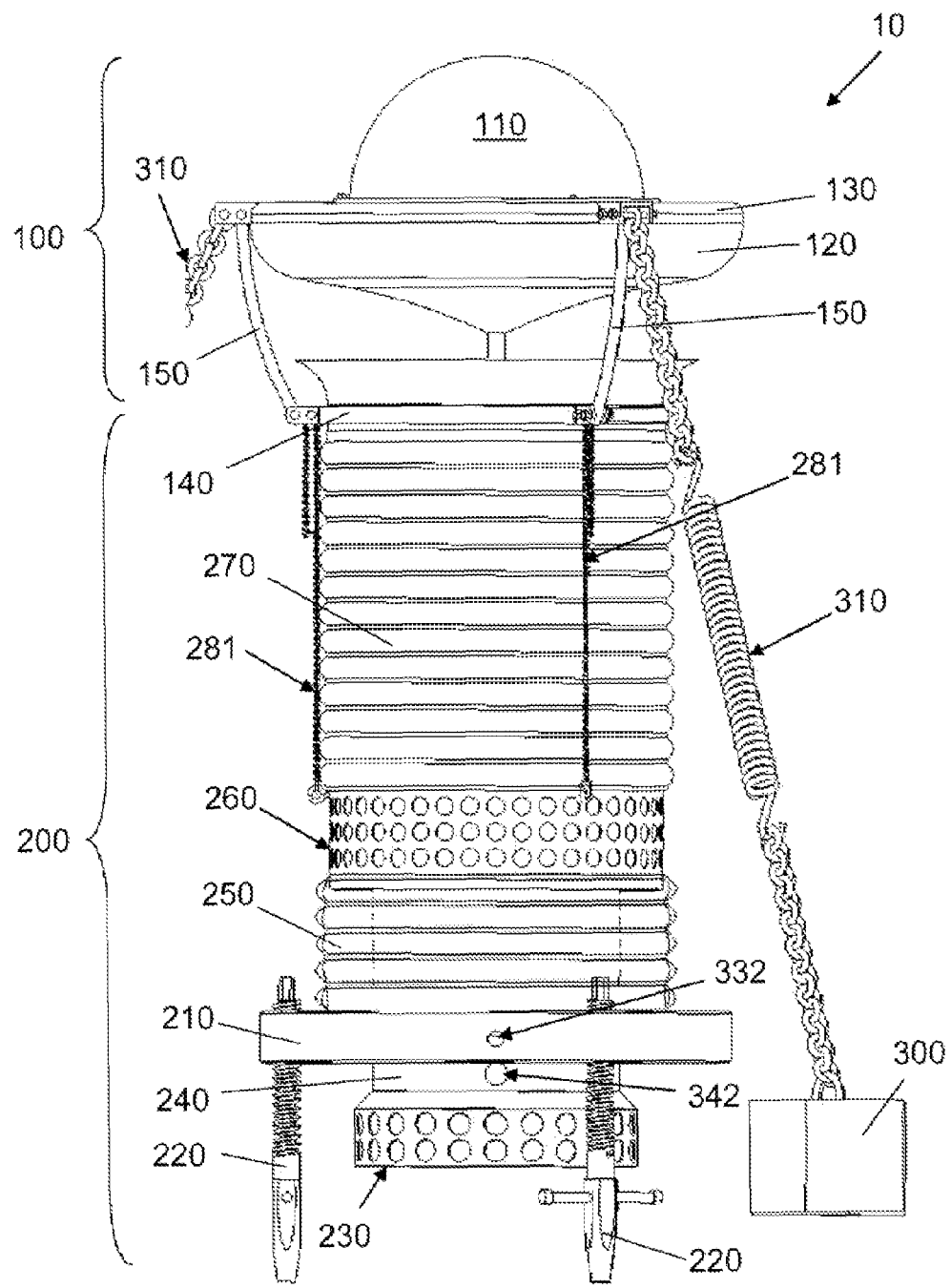
FIG. 1 is a side view of a water treatment apparatus.
Figure 2:
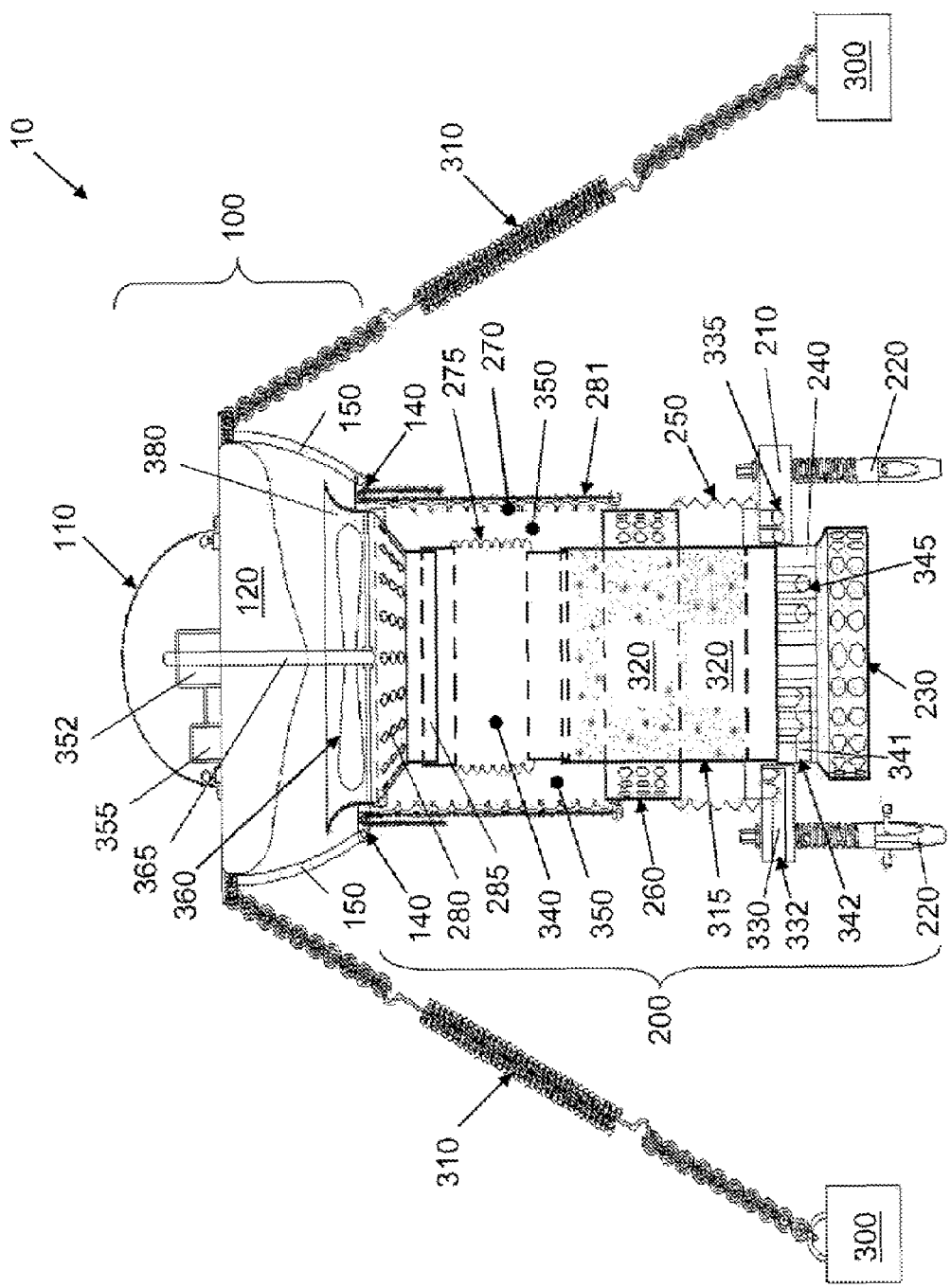
FIG. 2 is a front cross-sectional view of the water treatment apparatus of FIG. 1.
Figure 3:
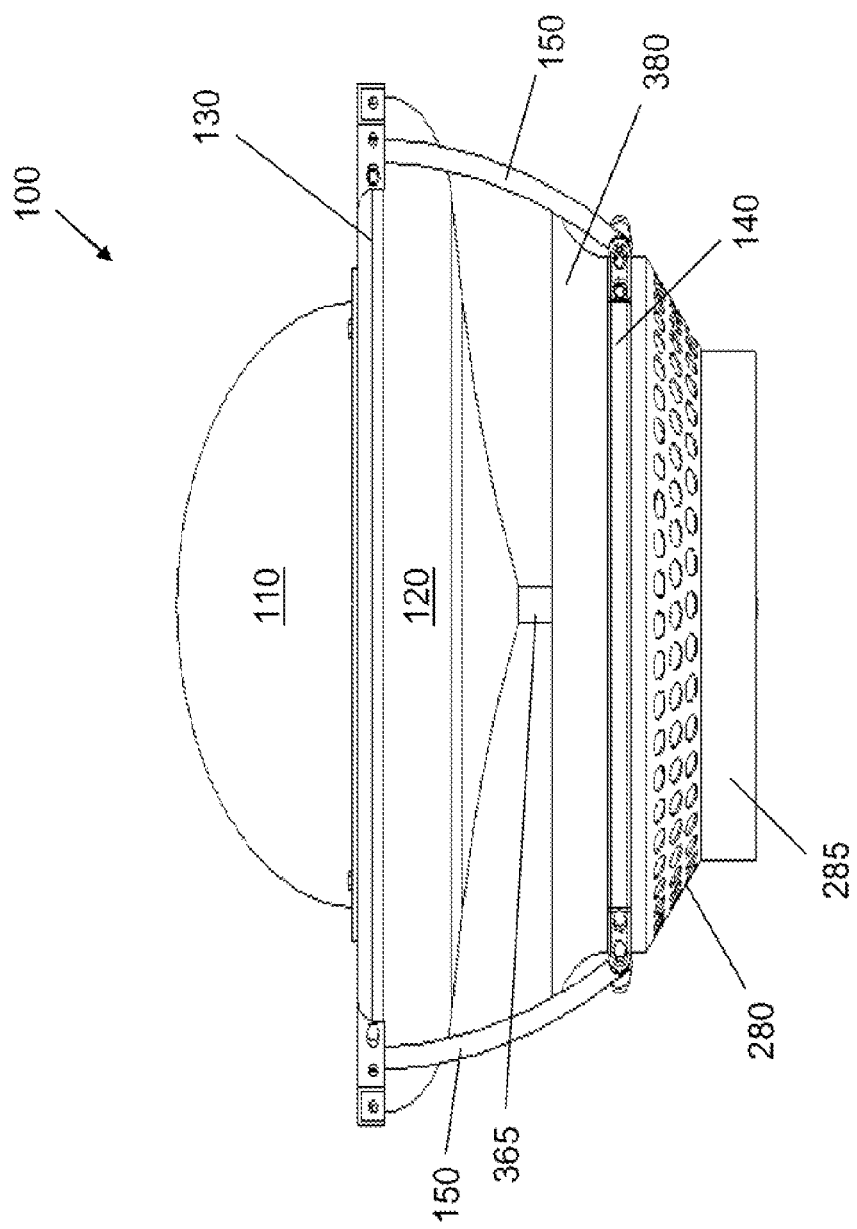
FIG. 3 is a detailed front view of the top portion of the water treatment apparatus of FIG. 1.

Referring to FIGS. 1 and 2, a water treatment apparatus 10 includes an upper section 100 and a lower section 200. The lower section 200 includes a base plate 210 and a plurality of legs 220 connected to the base plate 210. The legs 220 can stand on the water bed of a water body to support the water treatment apparatus 10. The legs 220 can be screwed on to the base plate 210 with adjustable heights to allow leveling of the base plate 210 according to height variation of the water bed.

Figure 4:
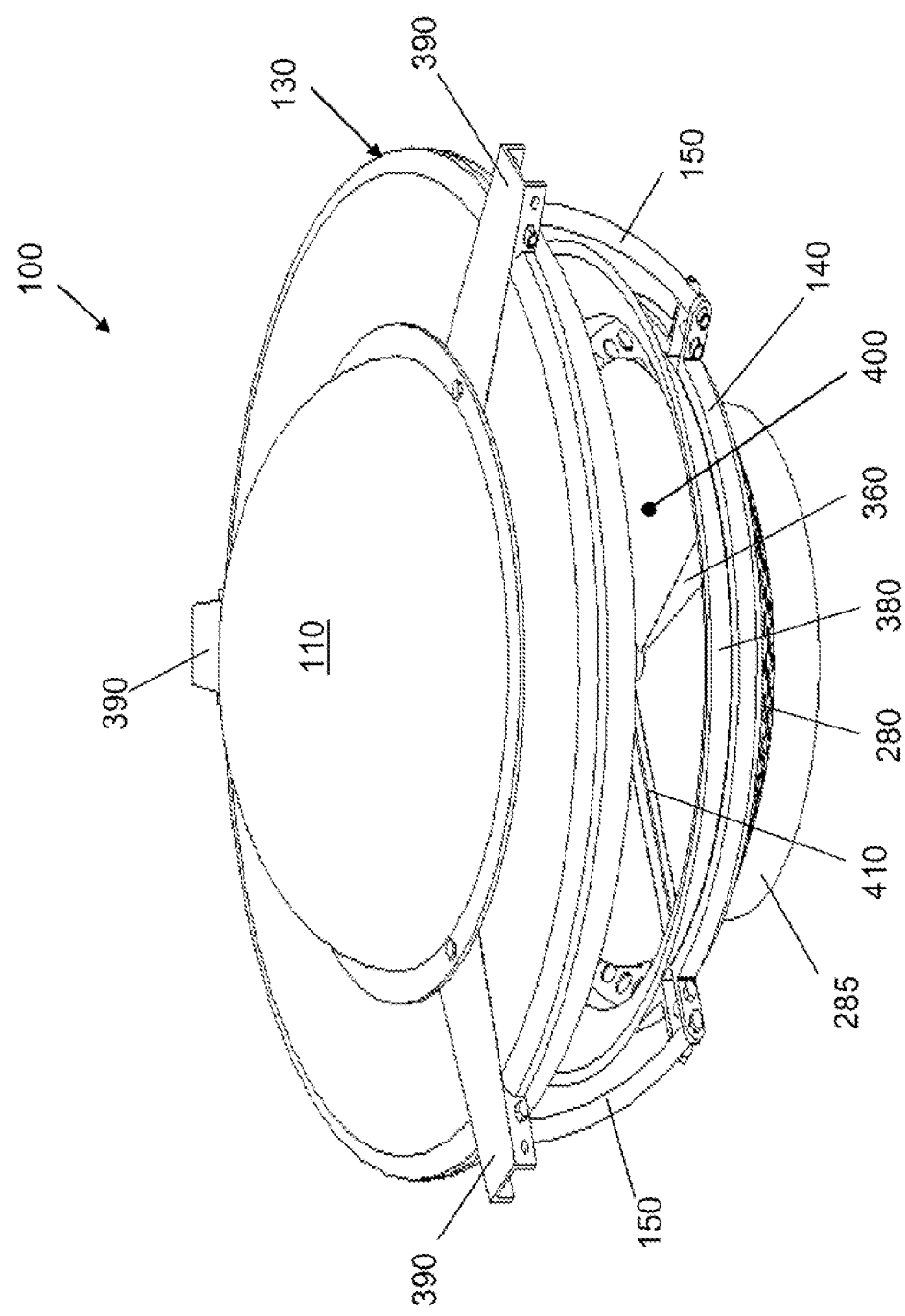
FIG. 4 is a detailed top perspective view of the top portion of the water treatment apparatus of FIG. 1.
Figure 5:
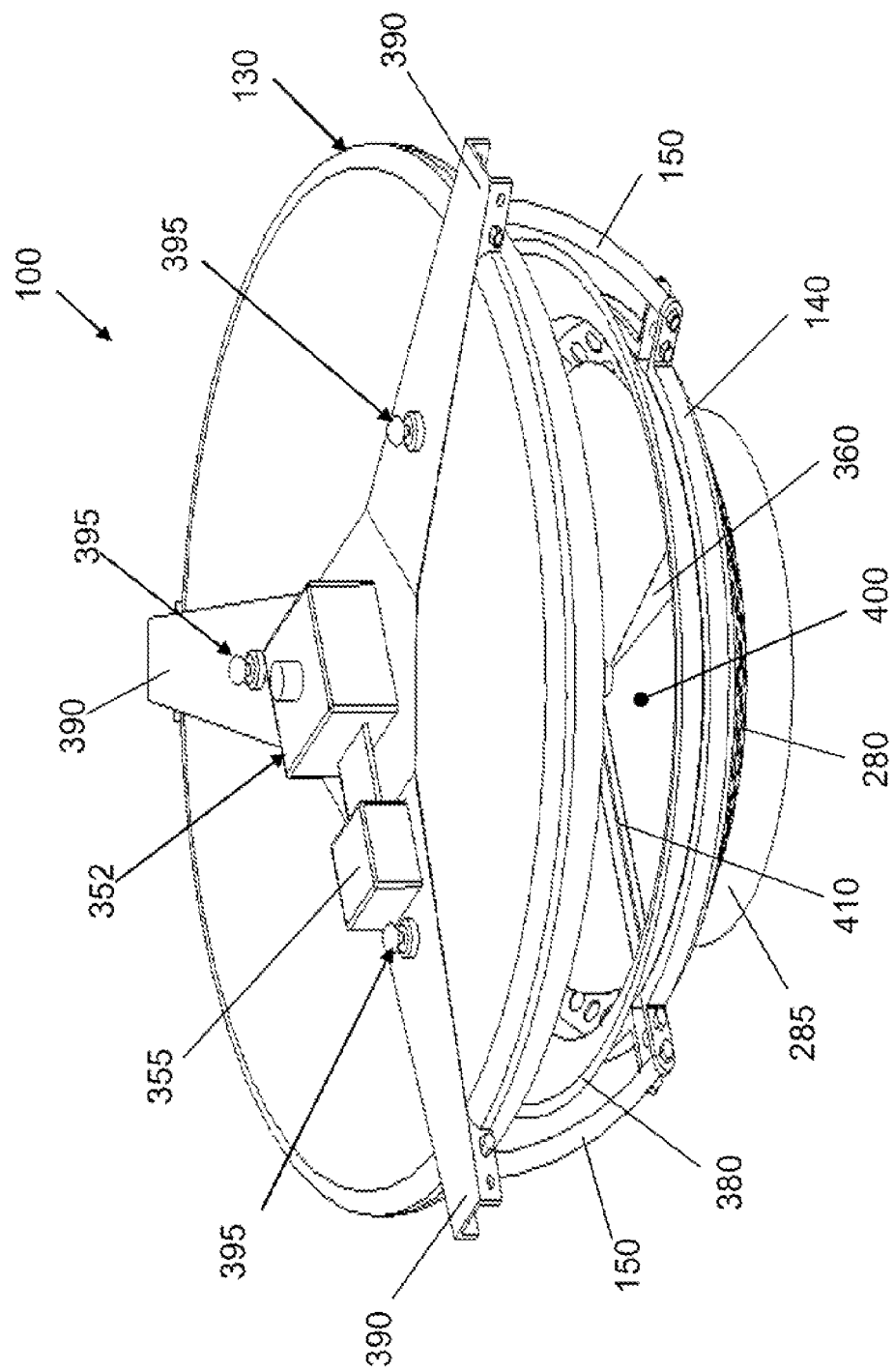
FIG. 5 is a detailed top perspective view of the top portion of the water treatment apparatus of FIG. 1 after the cover is removed.
Figure 6:
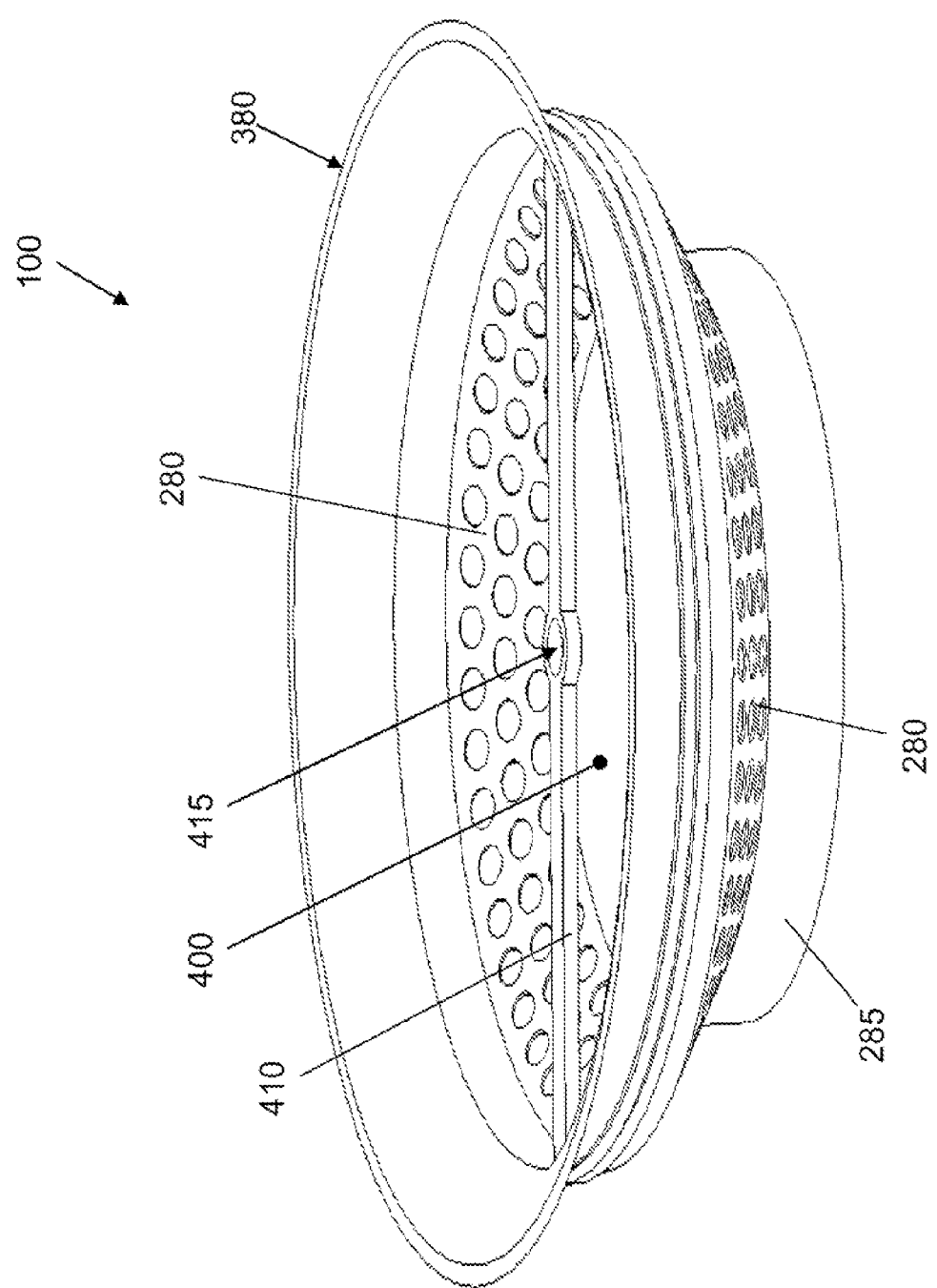
FIG. 6 is a detailed top perspective view of the top portion of the water treatment apparatus of FIG. 1 after the cover and the impeller are removed.

The lower section 200 includes an inlet 230, a wall 240 and an rigid reactor wall 315 mounted to the base plate 210, a filter 320 housed in the reactor wall 315, a flexible inner tube 275 connected to the reactor wall 315, a connection tube 285 with its lower ring connected to the flexible inner tube 275, and an outlet 280 connecting the upper ring of the connection tube 285 and the lower ring of the connection tube 285, where both rings use brackets 140 to fasten the flexible tubes 275 and 270. The flexible inner tube 275 can be made of PVC or other polymer materials. The inlet 230, the wall 240, the reactor wall 315, the filter 320, the flexible inner tube 275, and the connection tube 285 define a reactor channel 340. Contaminated water can flow into the reactor channel 340 from the inlet 230 and exit through the outlet 400 (FIGS. 4-6). The inlet 230 can provide physical screen to keep out fish, leaves, and other large objects in the natural water from entering the reactor channel 340. The inlet 230 can be formed by a mesh having a plurality of holes or a perforated plate. The openings of the inlet 230 can be directed to horizontal directions. Holes are not required at the bottom of the inlet 230.

The reactor wall 315 defines a reactor cage that can remove organic and inorganic wastes from natural water by physical and biochemical reactions. For example, the filter 320 installed in the reactor cage can comprise active carbon, porous silica, polyethylene media, and/or other bio-chemical carrier in a form of chunks, fibers, or woven cloth. The biochemical reaction carrier can be specially designed to remove certain biological or organic molecules from water. The filter 320 can be replaced or cleaned and reused after the use for a period of time. A bio-film can be formed on the surfaces of the filter 320 with the appropriate microorganisms to provide oxidation and nitrification of water flowing through the reactor channel 340, which can effectively reduce BOD, COD, TSS, TN and TP. The filter 320 can be formed by a single section or multiple sections. The length of the reactor and volume of filter media are subject to change depending on the severity of the water pollution and the volume of the natural water.

The lower section 200 includes a lower outer tube 250 mounted on the base plate 210, an inlet 260 mounted above the lower outer tube 250, and an upper outer tube 270 mounted between the brackets 140 and the inlet 260. The lower outer tube 250 and upper outer tube 270 can be rigid, semi-flexible, or flexible. The lower outer tube 250 and upper outer tube 270 can be made of PVC or other polymer materials. The circulation channel 350 is defined by the space between the outer tube 270 on the outside, and the connection tube 285, the flexible inner tube 275, and the reactor wall 315 inside. The water can flow into the circulation channel 350 through the inlet 260 and exit the circulation channel 350 through the outlet 280. The inlet 260 can be formed by a mesh, or a perforated plate to provide physical screen to keep out fish, leaves, and other large objects in the natural water from entering the circulation channel 350. Strings 281 are tied between the brackets 140 and the inlet 260, the position of the inlet 260 determines the depth of the circulated water.

The lower section 200 also includes an air conduit 330 that has an inlet 332 and an outlet 335 in the base plate 210. The air conduit 330 can also be positioned, for example, in a spiral fashion, around the inner surface of the lower outer tube 250. The air conduit 330 can receive air or oxygen from an external tube (not shown) connected to the inlet 332 and provides aeration to the water in the circulation channel 350. An exemplary air or oxygen flow of 5~30 liters/min can be delivered for an effective aeration.

The lower section 200 further includes an air conduit 341 that has an inlet 342 and an outlet 345 in the support plate 240 to provide aeration to the reactor channel 340. The air conduit 341 is wound (not shown), for example, in a spiral fashion, around the inner surface of the support plate 240. The air conduit 341 can receive air or oxygen from an external tube (not shown) connected to the inlet 342, and provides aeration to the water in the reactor channel 340 including the water in the filter 320. An exemplary air or oxygen flow of 1~5 liters/min can be delivered to provide oxygen for biochemical reactions to take place. The support plate 240 also has holes to let water from the inlet 230 below to flow through into the reactor channel 340. The support plate 240 and the base plate 210 are coupled by screws.

The upper section 100, referring to FIGS. 1-6, includes a cover 110 and a float 120 that are mounted on a frame 130. The frame 130 is connected to brackets 140 by connectors 150. The brackets 140 are fastened around the upper outer tube 270 and a rim 380, which securely holds the upper section 100 to the lower section 200. The rim defines the outlet 400 for the reactor channel 340. The float 120 can be circularly shaped around the axis defined by the shaft 365. The bottom of the float 120 can be streamline shaped to allow smooth water flow out of the reactor channel 340 and the circulation channel 350. The rim 380 can be circular shaped and shaped like a bowl. The upper surface of the rim 380 and the bottom surface of the float 120 can be almost parallel to each other to allow water exiting the reactor channel 340 and the circulation channel 350 to flow in the controlled direction. The rim 380 can have multiple stages and openings to facilitate different water flows at different stages.

The upper section 100 also includes a motor 352 and a controller 355 that can send control signals to the motor 352. The cover 110 can be formed by a metal or plastic material to shelter the motor 352 and the controller 355 from precipitation, rain, snow, and sun light. The motor 352 and the controller 355 are mounted on brackets 390 that are clamped on the frame 130 (FIG. 5). The motor 352 can rotate an impeller 360 through a shaft 365. To provide stability to the impeller, the end of the shaft 365 is mounted in a hole 415 in a crossbar 410 that is fixed across the rim 380 (FIG. 6). Light bulbs 395 can be installed on the brackets 390. The motor 352, the controller 355, and the light bulbs 395 can be powered externally via a cable (not shown) offshore such as normal power supply or solar and wind power.

The rotation of the impeller 360 can draw water upward from the circulation channel 350 via the outlet 280. The configuration of the circulation channel 350 and the impeller 360 are so designed that the flow rate in the circulation channel 350 is in a range between about 1,000 and about 5,000 gallons per minute. The rapid flow coupled with the aeration by the air conduit 330 in the circulation channel 350 can facilitate the effective diffusion to reach certain dissolved oxygen level, such as 2~10 mg/liter, in the circulation channel 350.

The rotation of the impeller 360 can simultaneously draw water from the reactor channel 340 via the outlet 400. The configurations of the reactor channel 340, the impeller 360, and the packing density of filtering media are so designed that the flow rate in the reactor channel 340 is in a range between about 5 and about 500 gallons per minute, which can be optimal for thorough biochemical reactions in the reactor cage and effective filtration by the filter 320 to handle BOD and COD loads. Moreover, the aeration by the air conduit 341 will provide the oxygen needed for the biochemical reaction. The lower surface of the float 120 and the rim 380 are so designed that water can flow along the streamline of the float and between the two surfaces 120 and 380 in a near laminar pattern. The float 120 can also be patterned so that the water can flow preferentially in certain angular directions.

An important feature of the described water treatment apparatus is that at least portions of the outer tube and the inner tube are flexible. The lengths of the upper outer tube 270 and the flexible inner tube 275 are automatically adjustable according to the depth of the water body to allow the float 120 stay at the water surface. The float 120 rises up on the surface of the water body with the rise of the water level, pulling the brackets 140 upward. The outer tube 270 and the flexible inner tube 275 are stretched longer. When the level of water body drops, the float 120 and the brackets 140 move downward along with the surface of the water body. The outer tube 270 and the flexible inner tube 275 shrink to shorter lengths. The water treatment apparatus 10 is thus adaptable to changes in water depth caused by seasonal changes and weather conditions.

The self-adjustable outer tube 270 and the flexible inner tube 275 allow all or most of the weight of the lower section 200 to be supported by the legs 220 and less weight to be lifted by the float 120. This allows smaller float 120 to be implemented in the water treatment apparatus 10. The lifting by the float 120 at the top and the supports by the legs 220 at the bottom in combination provide increased stability to the water treatment apparatus 10 in natural water.

Another advantageous feature of the described water treatment apparatus is that most of the components in the upper section 100 and the lower section 200 are positioned underneath the cover 100 and the float 120. The diameter of the float 120 is larger than the lateral spread of the connectors 150 and the width of the outer channel 350, thus blocking most of the components from view from above. As described, the float 120 can be implemented by small lateral widths due to the weight support by the legs 220. These in combination allow the described water treatment apparatus to have smaller foot print and few visible components on the surface of the natural water body. The described water treatment apparatus is thus more aesthetically appealing than many convention water treatment apparatuses that include multiple extended floats. The described water treatment apparatus is therefore ideal for deployment in parks, reservoirs, and rivers.

The water treatment apparatus 10 can have the following exemplified dimensions: the float 120 can have a diameter in a range from about 0.5 meter to about 3 meters. The upper section 100 can have a height in a range from about 0.5 meter to about 1.5 meter and a diameter in a range from about 0.5 meter to about 3 meters. The lower section 200 can have a height in a range from about 2 meters to about 10 meters and a diameter in a range from about 1 meter to about 5 meters. The reactor channel 340 can have a length in a range from about 1 meter to about 10 meters and a diameter in a range from about 0.5 meter to about 4 meters. The circulation channel 350 can have a length in a range from about 1 to about 10 meters. The flexible inner tube 275 is expandable with a length varying in a range from about 0.5 meter to about 8 meters. The flexible upper outer tube 270 is expandable to have a length in a range from about 1 meter to about 10 meters. The expandable range of the inner tube 275 and the upper outer tube 270 allow the float 120 to adapt to a water level variation in a range of +/−0.5~1 meter, depending on the depth of the nature water where the apparatus to be installed.

The water treatment apparatus 10 is suitable for a natural water body that is still or flow at different flow rates. The upper section 100 is pulled downward by weights 300 on the floor of the water body to help the water treatment apparatus 10 to stabilize in a flowing water body and windy weather. The brackets 390 can be tied to the weights 300 or other objects on the water bed by chains 310. The chains 310 can include elastic portions such as springs to allow the upper section 100 to adjust to the depth of the water, to absorb mechanical disturbances in the natural water, and to balance in the center of the weights 300. The combination of the float 120, the legs 220, and the chains 310 and weights 300 can prevent toppling of the water treatment apparatus 10 even under severe weather and water conditions.

The water treatment apparatus 10 can be assembled at the site of deployment. The connectors 150 can be easily opened to allow the components in the upper section 100 to be lifted and the filters 320 to be replaced through the center of the reactor channel 340. The legs 220 and the base plate 210 can also be detachable from the water treatment apparatus 10.

The disclosed apparatus and methods can include one or more of the following advantages. The disclosed apparatus and methods can provide effective water treatment to a natural water body with a wide range of contamination and pollution. The disclosed apparatus and methods can remove the pollutants (TSS, heavy metals, etc), reduce the nutrient level (TN, TP, BOD, COD), improve dissolved oxygen level, enhance the biodiversity and balance, and suppress the growth of harmful microorganisms such as blue green algae in natural water body.

The disclosed apparatus and methods can provide effective circulation, aeration diffusion, and filtration in an integrated apparatus to allow water treatment to be simultaneously conducted to achieve physical, chemical, and biological treatment goals. Bio-solid reduction, odor reduction, conversion and reduction of ammonia and nitrate, and thus suppression of blue green algae bloom in natural waters such as lakes and ponds, etc. can be accomplished.

The disclosed water treatment apparatus includes several water treatment capabilities such as circulation, aeration and diffusion, physical, chemical, and biological filtration, and chemical or biological reactions. The disclosed water treatment apparatus can effectively reduce the nutrient level in the water body through reduction of BOD, NH3, TN, TSS, and TP; to circulate and aerate the water body to eliminate odors and fish kills; and to eliminate bad algae bloom through suppressing the blue green algae growth and enhance the wellness of the food chain.

Moreover, the disclosed apparatus and methods allow easy and flexible deployment in different natural water environments. The disclosed water treatment apparatus is adjustable to be suitable for shallow or deep natural wafer bodies. The disclosed wafer treatment apparatus can remain stable in natural water that is still or flow at different rates like in rivers. The disclosed water treatment apparatus can be powered externally or by naturally generated power like wind power or solar energy.

The disclosed water treatment apparatus is effective in bio-solid reduction, odor reduction, conversion and reduction of ammonia and nitrate, and suppression of blue green algae bloom in natural waters such as lakes and ponds, etc.

Furthermore, the disclosed water treatment apparatus is aesthetically appealing with small footprint that minimizes the visual impact to the environment.

It is understood that the disclosed water treatment apparatus is applicable to a wide range of environment such as fresh water lagoons, lakes, reservoirs, rivers, waste water treatment plants, and waste water ponds. The relative positions of the reactor channel and the circulation channel can vary. For example, the reactor channel can be inner channel and the circulation channel can be outer channel, and vice versa.

What is claimed is:

1. A water treatment apparatus, comprising:
 a float configured to float on the surface of a water body;
 a first fluid channel coupled to the float and configured to filter contaminated water in the water body;
 a second fluid channel coupled to the float and configured to circulate contaminated water in the water body, wherein the first fluid channel and the second fluid channel are configured to have variable lengths to allow the float to adapt to different water levels; and
 a fluid transport apparatus configured to draw the contaminated water through the first fluid channel at a first flow rate and through the second fluid channel at a second flow rate.

2. The water treatment apparatus of claim 1, wherein at least a portion of the first fluid channel is disposed inside the second fluid channel.

3. The water treatment apparatus of claim 1, wherein at least a portion of the first fluid channel is formed by a first flexible tube that allows the first fluid channel to vary in length in accordance to the different water levels, and wherein at least a portion of the second fluid channel is formed by a second flexible tube that allows the second fluid channel to vary in length in accordance to the different water levels.

4. The water treatment apparatus of claim 3, wherein the first flexible tube has a first variable length in a range from about 0.5 meter to about 8 meters, and wherein the second flexible tube has a second variable length in a range from about 1 meter to about 10 meters.

5. The water treatment apparatus of claim 1, wherein the first flow rate is in a range between about 5 and about 500 gallons per minute.

6. The water treatment apparatus of claim 1, wherein the second flow rate is in a range between about 1,000 and about 5,000 gallons per minute.

7. The water treatment apparatus of claim 1, further comprising a filter installed in the first fluid channel and configured to filter the contaminated water flowing through the first fluid channel, wherein the filter comprises a material selected from the group consisting of active carbon, porous silica, polyethylene media, a biological reaction carrier, or a chemical reaction carrier.

8. The water treatment apparatus of claim 1, further comprising:
a first air conduit configured to transfer air or oxygen to aerate the contaminated water flowing through the first fluid channel; and
a second air conduit configured to transfer air or oxygen to aerate the contaminated water flowing through the second fluid channel.

9. The water treatment apparatus of claim 8, wherein air or oxygen is transferred to the first fluid channel by the first air conduit at a rate lower than the rate of air or oxygen transferred to the second fluid channel by the second air conduit.

10. The water treatment apparatus of claim 9, wherein air or oxygen is transferred to the first fluid channel by the first air conduit at a rate from about 1 to about 5 liters/mm, and wherein air or oxygen is transferred to the second fluid channel by the second air conduit at a rate from about 5 to about 30 liters/mm.

11. The water treatment apparatus of claim 1, wherein the fluid transport apparatus includes:
a motor; and
an impeller rotatably coupled to the motor, wherein the impeller is configured to draw the contaminated water through the first fluid channel and the second fluid channel.

12. The water treatment apparatus of claim 1, wherein the first fluid channel, the second fluid channel, and the fluid transport apparatus are disposed under the float when the water treatment apparatus is deployed in a water body.

13. The water treatment apparatus of claim 1, further comprising legs configured to stand on a floor of the water body to support at least a portion of the weight of the first fluid channel and the second fluid channel.

14. The water treatment apparatus of claim 1, further comprising means for tying the first fluid channel, the second fluid channel, and the fluid transport apparatus to an object at the floor of the water body.

15. The water treatment apparatus of claim 1, wherein the float has a diameter in a range from about 0.5 meter to about 3 meters, wherein the first fluid channel has a length in a range from about 1 meter to about 10 meters and a diameter in a range from about 0.5 meter to about 4 meters, and wherein the second fluid channel has a length in a range from about 1 to about 10 meters and a diameter in a range from about 1 meter to about 5 meters.

16. The water treatment apparatus of claim 1, further comprising a rim around an outlet of the second fluid channel, wherein outlets of the first fluid channel and the second fluid channel are positioned below the float when the water treatment apparatus is deployed in a water body, and wherein the contaminated water exiting the first fluid channel and the second fluid channel flows through a gap between the float and the rim.

17. A water treatment apparatus, comprising:
a float configured to float on the surface of a water body;
a first fluid channel coupled to the float and configured to filter contaminated water in the water body;
a first air conduit configured to transfer air or oxygen to aerate the contaminated water flowing through the first fluid channel;
a second fluid channel coupled to the float and configured to circulate contaminated water in the water body, wherein at least a portion of the second fluid channel is formed by a second flexible tube that allows the second fluid channel to vary in length in accordance to the different water levels;
a second air conduit configured to transfer air oxygen to aerate the contaminated water flowing through the second fluid channel; and
a fluid transport apparatus configured to draw the contaminated water through the first fluid channel and the second fluid channel.

18. The water treatment apparatus of claim 17, wherein the fluid transport apparatus is configured to draw the contaminated water through the first fluid channel at a first flow rate and through the second fluid channel at a second flow rate higher than the first rate.

19. The water treatment apparatus of claim 18, wherein the first flow rate is in a range between about 5 and about 500 gallons per minute.

20. The water treatment apparatus of claim 18, wherein the second flow rate is in a range between about 1,000 and about 5,000 gallons per minute.

21. The water treatment apparatus of claim 17, wherein at least a portion of the first fluid channel is formed by a first flexible tube that allows the first fluid channel to vary in length in accordance to the different water levels.

22. The water treatment apparatus of claim 17, further comprising a filter installed in the first fluid channel and configured to filter the contaminated water flowing through the first fluid channel, wherein the filter comprises a material selected from the group consisting of active carbon, porous silica, polyethylene media, a biological reaction carrier, or a chemical reaction carrier.

23. The water treatment apparatus of claim 17, wherein air or oxygen is transferred to the first fluid channel by the first air conduit at a rate lower than the rate of air or oxygen transferred to the second fluid channel by the second air conduit.

24. The water treatment apparatus of claim 23, wherein air or oxygen is transferred to the first fluid channel by the first air conduit at a rate from about 1 to about 5 liters/mm, and wherein air or oxygen is transferred to the second fluid channel by the second air conduit at a rate from about 5 to about 30 liters/mm.

25. The water treatment apparatus of claim 17, further comprising legs configured to stand on the floor of the water body to support at least a portion of the weight of the first fluid channel and the second fluid channel.

26. A water treatment apparatus, comprising:
a float configured to float on the surface of a water body;
a first fluid channel coupled to the float and configured to filter contaminated water in the water body, wherein at least a portion of the first fluid channel is formed by a first flexible tube that allows the first fluid channel to vary in length in accordance to different water levels;

a first air conduit configured to transfer air or oxygen to aerate the contaminated water flowing through the first fluid channel;

a second fluid channel coupled to the float and configured to circulate contaminated water in the water body, wherein at least a portion of the first fluid channel is disposed inside the second fluid channel, wherein at least a portion of the second fluid channel is formed by a second flexible tube that allows the second fluid channel to vary in length in accordance to the different water levels;

a second air conduit configured to transfer air oxygen to aerate the contaminated water flowing through the second fluid channel;

legs configured to stand on a floor of the water body to support at least a portion of the weight of the first fluid channel and the second fluid channel; and a fluid transport apparatus comprising a motor and an impeller rotatably coupled to the motor and configured to draw the contaminated water through the first fluid channel at a first flow rate in a range between about 5 and about 500 gallons per minute, wherein the impeller is configured to draw the contaminated water through the second fluid channel at a second flow rate in a range between about 1,000 and about 5,000 gallons per minute, wherein the first fluid channel, the second fluid channel, and the fluid transport apparatus are disposed under the float when the water treatment apparatus is deployed in a water body.

27. The water treatment apparatus of claim 26, wherein the first flexible tube has a first variable length in a range from about 0.5 meter to about 8 meters, and wherein the second flexible tube has a second variable length in a range from about 1 meter to about 10 meters.

28. The water treatment apparatus of claim 26, wherein the filter comprises a material selected from the group consisting of active carbon, porous silica, polyethylene media, a biological reaction carrier, or a chemical reaction carrier.

29. The water treatment apparatus of claim 26, wherein air or oxygen is transferred to the first fluid channel by the first air conduit at a rate lower than the rate of air or oxygen transferred to the second fluid channel by the second air conduit.

30. The water treatment apparatus of claim 29, wherein air or oxygen is transferred to the first fluid channel by the first air conduit at a rate from about 1 to about 5 liters/mm, and wherein air or oxygen is transferred to the second fluid channel by the second air conduit at a rate from about 5 to about 30 liters/mm.

31. The water treatment apparatus of claim 26, further comprising means for tying the first fluid channel, the second fluid channel, and the fluid transport apparatus to an object at the floor of the water body.

32. The water treatment apparatus of claim 26, wherein the float has a diameter in a range from about 0.5 meter to about 3 meters, wherein the first fluid channel has a length in a range from about 1 meter to about 10 meters and a diameter in a range from about 0.5 meter to about 4 meters, and wherein the second fluid channel has a length in a range from about 1 to about 10 meters and a diameter in a range from about 1 meter to about 5 meters.

33. The water treatment apparatus of claim 26, further comprising a rim around an outlet of the second fluid channel, wherein the contaminated water exiting the first fluid channel and the second fluid channel flows through a gap between the float and the rim.

* * * * *